US007934292B2

(12) United States Patent
Degner et al.

(10) Patent No.: US 7,934,292 B2
(45) Date of Patent: May 3, 2011

(54) HINGE MECHANISM (75) Inventors: Brett William Degner, Menlo Park, CA (US); John Ternus, Redwood City, CA (US); Andy Lauder, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 4 days.

(21) Appl. No.: 11/650,249

(22) Filed: Jan. 4, 2007

(65) Prior Publication Data
US 2008/0163460 A1 Jul. 10, 2008

(51) Int. Cl.
E05D 11/10 (2006.01)
(52) U.S. Cl. ............................................ 16/334; 16/301
(58) Field of Classification Search .................. 16/334, 16/374, 375, 291, 336, 319, 363, 295, 321, 16/323, 377, 343–346, 352, 353, 337, 379; 297/378.11, 463.1, 378.12; 361/681–683; 248/917–923; 220/841, 274, 284; 360/369, 360/720
See application file for complete search history.

(56) References Cited

U.S. PATENT DOCUMENTS

| | | | | |
|---|---|---|---|---|
| 2,098,921 A * | 11/1937 | Mandaville | ............ | 351/113 |
| 2,179,113 A * | 11/1939 | Bates | ............ | 16/379 |
| 4,672,715 A * | 6/1987 | Beckwith | ............ | 16/334 |
| 4,848,873 A * | 7/1989 | Villar | ............ | 359/230 |
| 4,882,807 A * | 11/1989 | Frye et al. | ............ | 16/225 |
| 4,949,426 A * | 8/1990 | Komaki | ............ | 16/308 |
| 5,487,525 A * | 1/1996 | Drabczyk et al. | ............ | 248/639 |
| 5,515,575 A * | 5/1996 | Pinazza | ............ | 16/228 |
| 6,148,481 A * | 11/2000 | Chen | ............ | 16/334 |
| 6,158,088 A * | 12/2000 | Bulboaca | ............ | 16/291 |
| 6,213,438 B1 * | 4/2001 | Ostby et al. | ............ | 248/276.1 |
| 6,585,324 B2 * | 7/2003 | Eppert et al. | ............ | 297/463.1 |
| 6,651,295 B2 * | 11/2003 | Hodson | ............ | 16/85 |
| 6,657,853 B2 * | 12/2003 | Oba et al. | ............ | 361/681 |
| 6,659,559 B1 * | 12/2003 | Metzler et al. | ............ | 297/378.12 |
| 6,814,438 B2 * | 11/2004 | Desbiez-Piat | ............ | 351/153 |
| 6,938,303 B2 * | 9/2005 | Watson et al. | ............ | 16/334 |
| 6,954,221 B2 * | 10/2005 | Wu | ............ | 361/681 |
| 7,222,396 B2 | 5/2007 | Lu et al. | | |
| 7,232,098 B2 * | 6/2007 | Rawlings et al. | ............ | 248/121 |
| 7,520,024 B2 | 4/2009 | Wang | | |
| 7,621,020 B2 | 11/2009 | Hsu et al. | | |
| 7,661,176 B2 | 2/2010 | Hsu et al. | | |

(Continued)

OTHER PUBLICATIONS

Apple Computer, Inc., "IMAC 24-Inch Vesa Mount Adapter (Installation Guide)", As of 2006, Total pp. 60 pages, Document Bar Code No. 1Z034-3927-A.

Primary Examiner — David J Bagnell
Assistant Examiner — Matthew Sullivan
(74) Attorney, Agent, or Firm — Beyer Law Group LLP (57) ABSTRACT A hinge is disclosed. The hinge can include an axle, a first member coupled to the axle, and a second member coupled to the axle and configured to rotate relative to the first member and around the axle. The hinge can further include a stop mechanism configured to stop the second member from rotating, relative to the first member, in a first direction and beyond a first range when the stop mechanism is in a first position and the second member is in the first range. The stop mechanism can be further configured to allow the second member to rotate, relative to the first member, in the first direction, beyond the first range, and into a second range when the stop mechanism is in a second position and the second member is in the first range.

30 Claims, 11 Drawing Sheets

U.S. PATENT DOCUMENTS

| | | | |
|---|---|---|---|
| 2002/0174519 A1* | 11/2002 | Huang | 16/319 |
| 2006/0104014 A1* | 5/2006 | Cherone et al. | 361/681 |
| 2007/0146979 A1* | 6/2007 | Chen et al. | 361/681 |
| 2007/0283533 A1* | 12/2007 | Wang | 16/337 |
| 2008/0229544 A1 | 9/2008 | Hsu et al. | |
| 2009/0260187 A1 | 10/2009 | Wang et al. | |

* cited by examiner

HINGE MECHANISM

BACKGROUND OF THE INVENTION

A hinge can be utilized to articulate (or couple) two individual parts of a device and enable a relative rotation of the two individual parts. For example, a display system can include a hinge that articulates a display unit relative to a display stand such that a user can move (or rotate) the display unit with respect to the display stand when adjusting the display system for a desirable viewing angle. The hinge typically includes mounting interfaces, such as screws or screw holes, for mounting the parts, such as the display unit and the display stand, to the hinge.

In the prior art, there exist external hinges that are exposed, visible, and accessible to the user from outside of the display system without requiring the user to manipulate the device. Applications of the external hinge can have several disadvantages. For example, exposed mechanisms (e.g., mounting interfaces) of the external hinge can be aesthetically undesirable. In order to make the exposed mechanisms aesthetically acceptable or desirable, additional costs can incur for the design and the material of external hinge.

Further, the exposed mechanisms can be significantly subject to unfavorable factors, such as contamination, dust accumulation, and spilled water or drink, which can reduce the reliability and durability of the external hinge.

The exposed mechanisms can also be subjected to unnecessarily manipulations by the user. The unnecessary manipulations can cause damage to the external hinge.

In the prior art, the hinge can also represent a hidden hinge that is invisible and inaccessible to the user without opening or removing an enclosure of the device. Applications of the hidden hinge can also have several disadvantages. For example, the enclosure can incur additional costs, weight, and complexity of design for the device. The enclosure can also require a particular tool to open or remove, in order for the user to have access to the hinge; inconvenience to the user can be involved.

Further, once the enclosure is opened or removed, other components of the devices can also become accessible to the user and can be subject to unnecessary manipulation or contacts, which can be undesirable in view of the reliability and durability of these other components.

SUMMARY OF INVENTION

One or more embodiments of the present invention can relate to a hinge. The hinge can include an axle, a first member coupled to the axle, and a second member coupled to the axle and configured to rotate relative to the first member and around the axle. The hinge can further include a stop mechanism configured to stop the second member from rotating, relative to the first member, in a first direction and beyond a first range when the stop mechanism is in a first position and the second member is in the first range. The stop mechanism can be further configured to allow the second member to rotate, relative to the first member, in the first direction, beyond the first range, and into a second range when the stop mechanism is in a second position and the second member is in the first range.

The above summary relates to only one of the many embodiments of the invention disclosed herein and is not intended to limit the scope of the invention, which is set forth is the claims herein. These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention can be practiced without some or all of these specific details. In other instances, well known process steps and/or structures have not been described in detail in order to not unnecessarily obscure the present invention.

In one or more embodiments, the present invention can relate to a hinge that can include an axle, a first member coupled to the axle, and a second member coupled to the axle and configured to move (or rotate) relative to the first member and around the axle. The hinge can further include a stop mechanism configured to stop the second member from rotating, relative to the first member, in a first direction and beyond a first range when the stop mechanism is in a first position and the second member is in the first range. The stop mechanism can be further configured to allow the second member to rotate, relative to the first member, in the first direction, beyond the first range, and into a second range when the stop mechanism is in a second position and the second member is in the first range.

One or more embodiments of the present invention can involve an assembly that can include a first module, a second module, and a hinge configured to couple the first module with the second module. The hinge can include a first member mounted to the first module through a first mounting interface, a second member mounted to the second module through a second mounting interface, and an axle coupled to the first member and the second member and configured to support a relative rotation between the first member and the second member.

The hinge can further include a stop mechanism configured for limiting the relative rotation within a normal-travel range such that at least one of the first mounting interface and the second interface can be hidden when the stop mechanism in a stopping position.

The stop mechanism can be further configured to allow the relative rotation to extend beyond the normal-travel range and into an over-travel range such that the at least one of the first mounting interface and the second mounting interface can be exposed when the stop mechanism is in a permitting position.

In one or more embodiments, the stop mechanism can be further configured for limiting the relative rotation within the over-travel range such that the at least one of the first mounting interface and the second mounting interface can remain exposed when the stop mechanism is in the stopping position.

In this document, references to rotations and movements can represent relative rotations and relative movements, respectively. For example, if the second member (or module) is stationary, a rotation of the second member or module relative to the first member (or module) in a first direction can represent a rotation of the first member (or module) relative to an absolute coordinate system and the second member (or module) in a second direction opposite to the first direction. Further, if a pin is stationary, a movement of the pin relative to a channel in the first direction can represent a movement of the channel relative to the absolute coordinate system and the pin in the second direction opposite to the first direction.

The features and advantages of the present invention can be better understood with reference to the figures and discussions that follow.

Figure 1A:
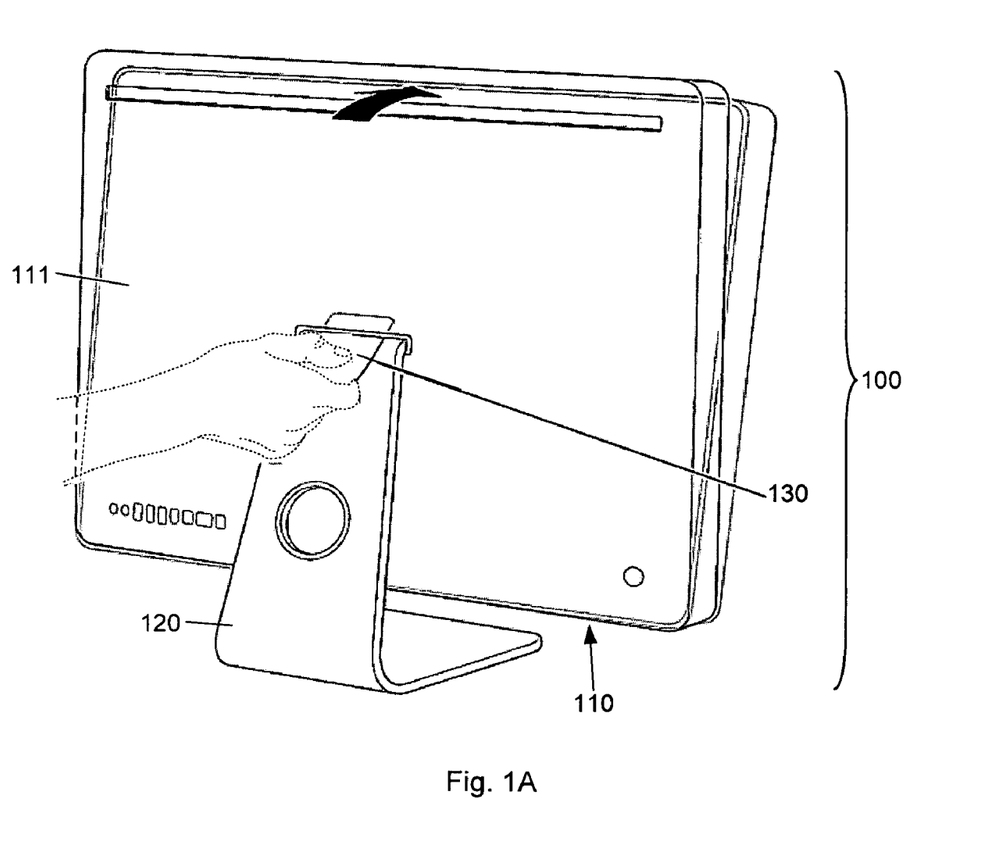
FIG. 1A shows, in accordance with one or more embodiments of the present invention, an assembly that can include a first module and a second module coupled to the first module.

FIG. 1A shows, in accordance with one or more embodiments of the present invention, assembly 100 that can include first module 110 and second module 120 coupled to first module 110. In one or more embodiments, first module 110 can include a flat panel display. Further, in one or more embodiments, second module 120 can include a support structure or a stand.

First module 110 and second module 120 can be coupled through a hinge (such as hinge 200 shown in the example of FIGS. 2A and 3) that can be hidden inside an enclosure 111 of first module 110. As shown in the example of FIG. 1A, in one or more embodiments, a user of assembly 100 can insert a thin object, such as card 130, through a gap between first module 110 and second module 120 to trigger the hinge such that the first module 110 and second module 120 can have a relative rotation to expose the mounting interface such that the mounting interface is accessible to the user.

Figure 1B:
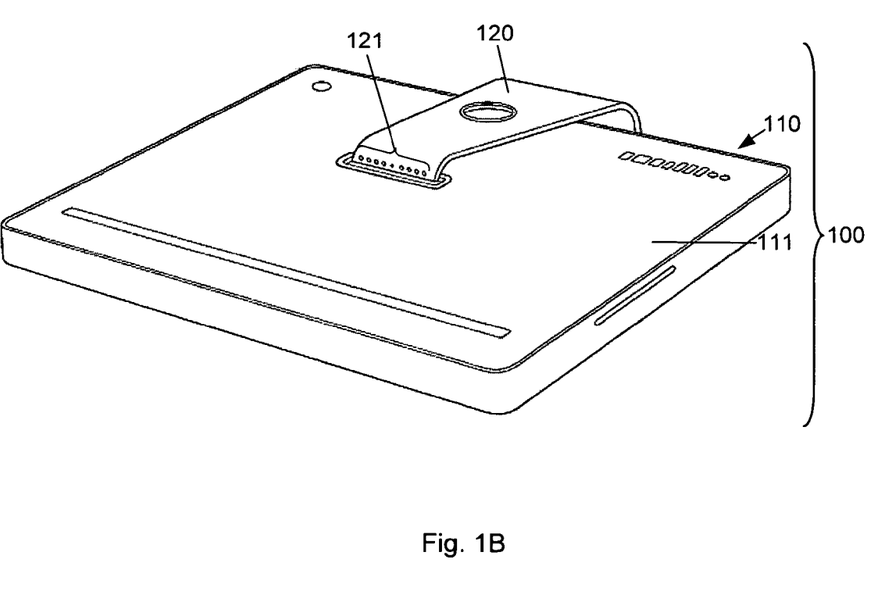
FIG. 1B shows, in accordance with one or more embodiments of the present invention, the assembly shown in FIG. 1A with a mounting interface (through which the second module and a hinge are coupled) exposed without opening or removal of the enclosure of the first module.
Figure 2A:
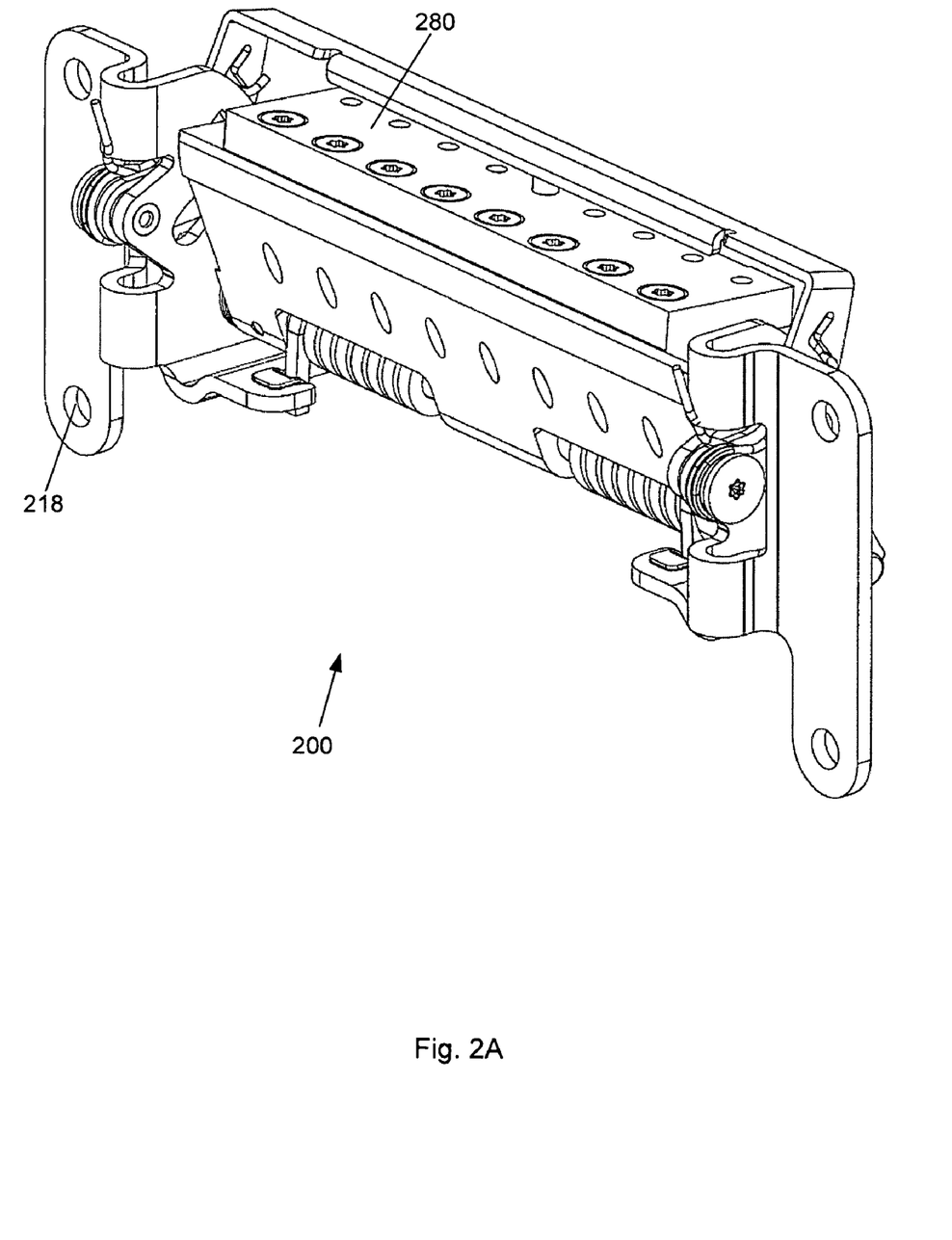
FIG. 2A shows, in accordance with one or more embodiments of the present invention, a perspective view of the hinge.
Figure 3:
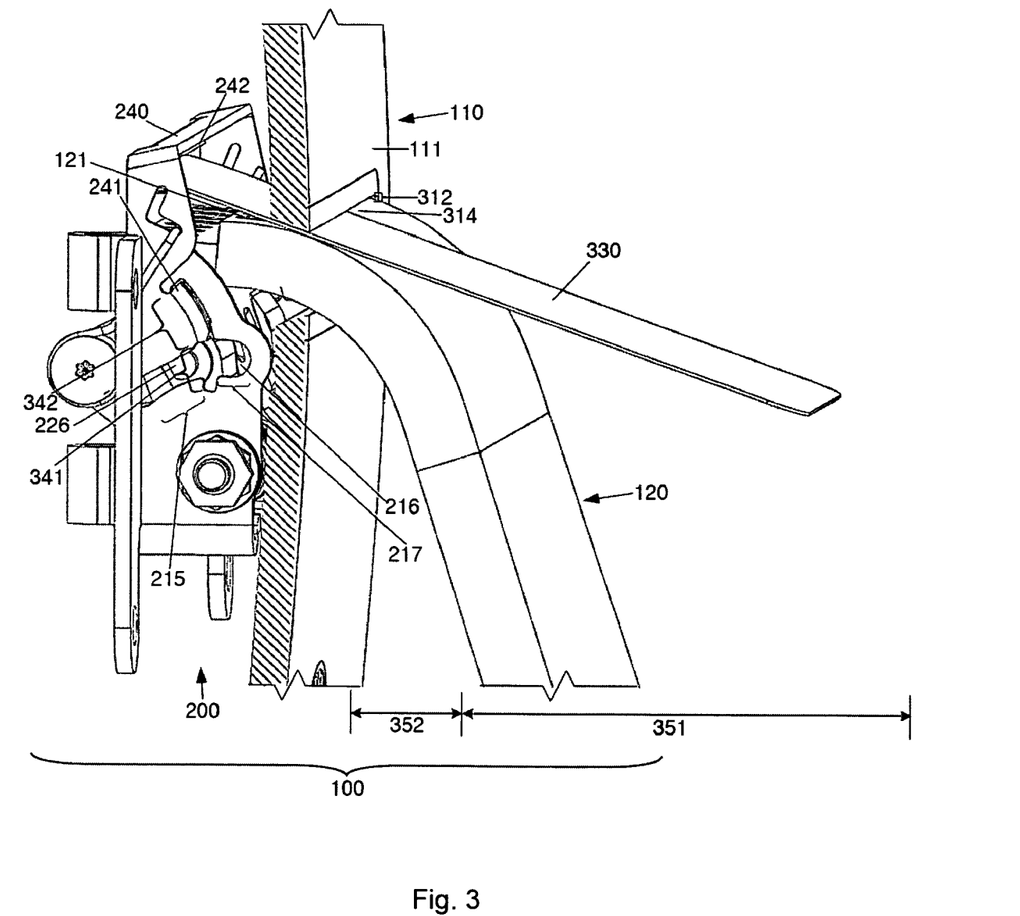
FIG. 3 shows, in accordance with one or more embodiments of the present invention, a partial perspective view of the assembly with the hinge in a permitting configuration such that the second module can move (or rotate) between a normal-travel range (first range) and an over-travel range (second range) relative to the first module.

FIG. 1B shows, in accordance with one or more embodiments of the present invention, assembly 100 with mounting interface 121 (through which second module 120 and the hinge, such as hinge 200 shown in the example of FIGS. 2A and 3, are coupled) exposed without opening or removal of enclosure 111 of first module 110. In FIG. 1B, the mounting interface of the hinge is blocked by mounting interface 121 of second module 120. Second module 120 is mounted to the hinge through mounting interface 121 and the mounting interface of the hinge.

Figure 1C:
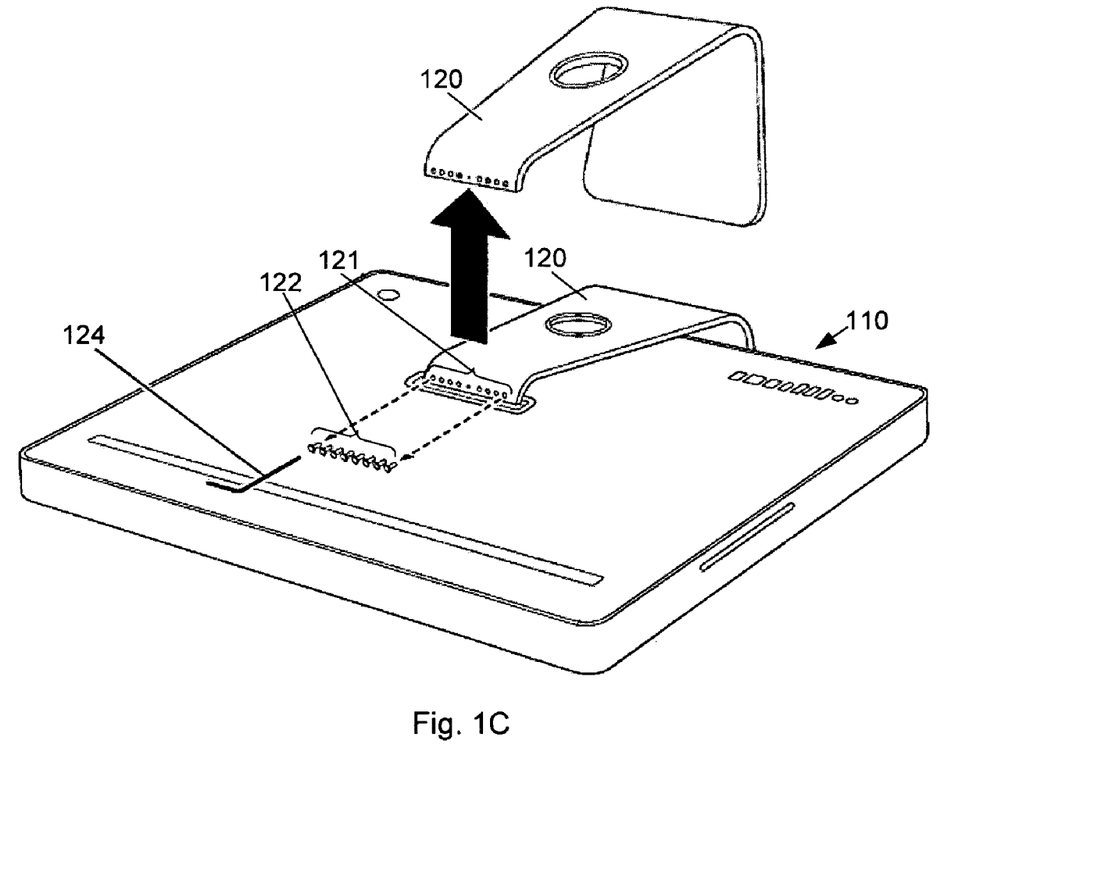
FIG. 1C shows, in accordance with one or more embodiments of the present invention, the mounting interface unfastened and the second module uncoupled from the first module.

FIG. 1C shows, in accordance with one or more embodiments of the present invention, mounting interface 121 unfastened and second module 120 uncoupled from first module 110. Second module 120 can have been mounted to the hinge utilizing a set of screws 122 that fastens mounting interface 121 to the mounting interface of the hinge, which can be fastened to first module 110. The set of screws 122 can be fastened and unfastened utilizing tool 124 such as a torque tool, a hex tool, or a screwdriver.

Figure 1D:
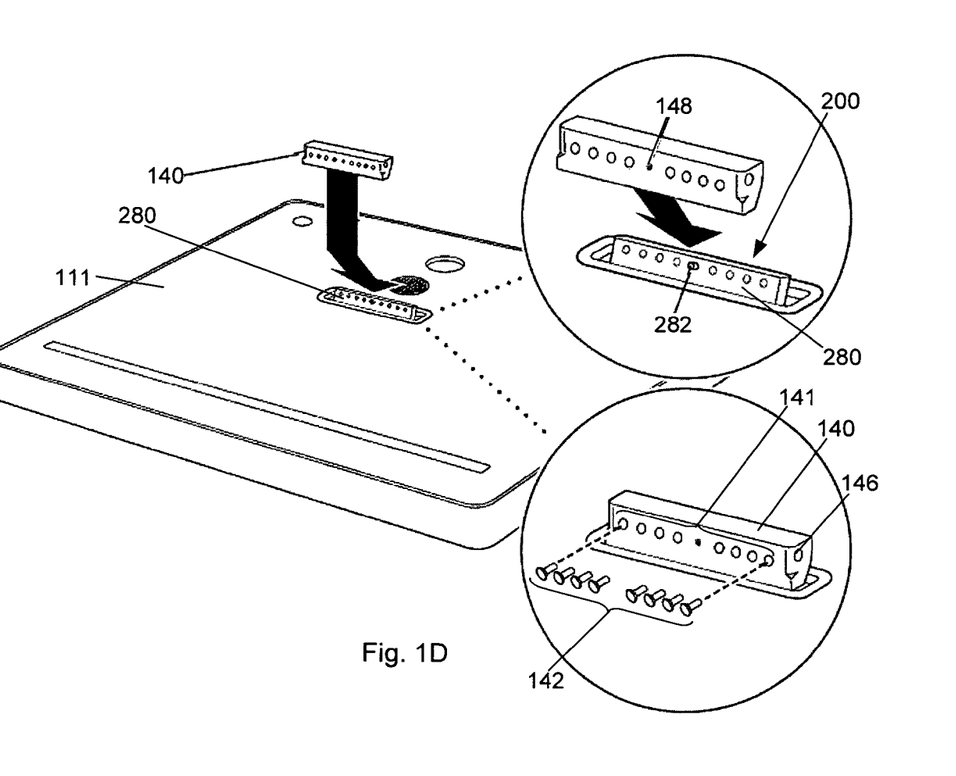
FIG. 1D shows, in accordance with one or more embodiments of the present invention, the mounting interface of the hinge.

FIG. 1D shows, in accordance with one or more embodiments of the present invention, mounting interface 280 of hinge 200. In one or more embodiments, mounting interface 280 can be mounted to an adapter, such as adapter 140, which can in turn be connected to a third module, such as a support structure or mechanism that is different from second module 120 (shown, for example, in FIG. 1C). In one or more embodiments, mounting interface 280 can be mounted directly to a module without utilizing the adapter.

In one or more embodiments, mounting interface 280 can include alignment structure 282 configured to align mounting interface 280 with adapter 140 or another module that includes a matching structure, such as matching structure 148. The alignment structure 282 can be further configured to enable the user to apply a force to extract the mounting interface 280 out from enclosure 111 when mounting interface 280 is hidden inside enclosure 111.

Adapter 140 can include mounting interface 141. Mounting interface 141 can be configured such that adapter 140 can be fastened to mounting interface 280 through mounting interface 141 and mounting face 182 by utilizing a set of screws such as screws 142. Adapter 140 can further include mounting interface 146 configured to enable adapter 140 to be connected to the third module.

FIG. 2A shows, in accordance with one or more embodiments of the present invention, a perspective view of hinge 200. As shown in FIG. 2A, hinge 200 can include mounting interface 280, through which hinge 200 can be coupled to second module 120 (shown in the example of FIG. 1A-D). Hinge 200 can further include mounting interface 218, through which hinge 200 can be coupled to first module 110 (shown in the example of FIG. 1A-D).

Figure 2B:
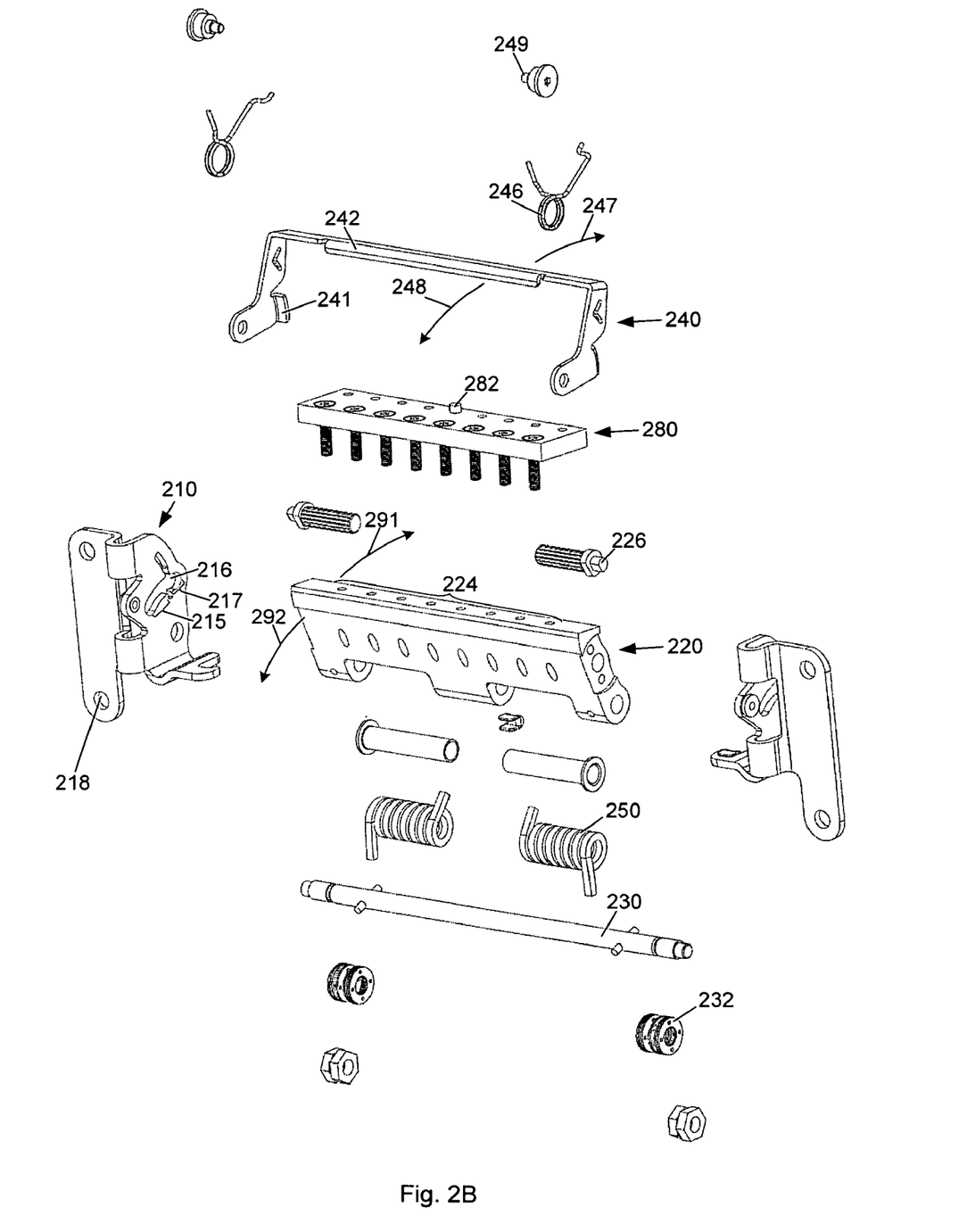
FIG. 2B shows, in accordance with one or more embodiments of the present invention, an exploded view of the hinge.

FIG. 2B shows, in accordance with one or more embodiments of the present invention, an exploded view of hinge 200. As shown in the example of FIG. 2B, hinge 200 can include axle 230. Hinge 200 can also include a first member coupled to axle 230. The first member can be illustrated by bracket 210. Bracket 210 can be configured to be coupled with first module 110 shown in the example of FIGS. 1A-D through mounting interface 218. Hinge 200 can further include a second member rotatably coupled to axle 230 and is configured to rotate relative to the first member. The second member can be illustrated by interconnect 220. Interconnect 220 can be configured to be coupled to second module 120 shown in the example of FIGS. 1A-D through mounting interface 280.

Bracket 210 can include channel 216 that can allow pin 226 to travel within channel 216 when interconnect 220 rotates relative to bracket 210. Channel 216 can be configured to limit the travel of pin 226, thereby limiting the rotation of interconnect 220 relative to bracket 210, in other words, limiting relative rotation between bracket 210 and interconnect 220.

Channel 216 can be divided into first section 215 and second section 217. First section 215 can correspond to a first range of the relative rotation between bracket 210 and interconnect 220. The first range can represent a normal-travel range such that mounting interface 280 is hidden inside enclosure 111 of first module 110 (shown in FIGS. 1A-D). Second section 217 can be associated with a second range of the relative rotation between bracket 210 and interconnect 220. The second range can represent an over-travel range of interconnect 220 relative to bracket 210, or an over-travel range of second module 120 relative to first module 110, such that mounting interface 280 can be exposed.

Interconnect 220 can include mounting interface 224, through which mounting interface 280 can be coupled to interconnect 220. In one or more embodiments, mounting interface can represent part of interconnect 220.

Hinge 200 can further include pin 226 connected to interconnect 220. In one or more embodiments, pin 226 can represent part of interconnect 220.

Hinge 220 can further include a stop mechanism, as illustrated by bail mechanism 240. Bail mechanism 240 can include latch 241 configured to provide an endpoint for the travel of pin 226 within first section 215 and to provide another endpoint for the travel of pin 226 within second section 217. When bail mechanism 240 is in a first position (stopping position), latch 241 is positioned between the first section 215 and second section 217. Accordingly, pin 226 is limited to travel within only one of first section 215 and second section 217.

When pin 226 is in first section 217 and latch 241 is positioned between first section 215 and second section 217, the relative rotation between bracket 210 and interconnect 220 can be limited to the normal-travel range, i.e., interconnect 220 can be prevented from rotating beyond the normal-travel range and in first direction 291. When pin 226 is in second section 217 and latch 241 is positioned between first section 215 and second section 217, the relative rotation between bracket 210 and interconnect 220 can be limited to the over-travel range, i.e., interconnect 220 can be prevented from rotating beyond the over-travel range and in second direction 292.

Bail mechanism 240 can further include contact portion 242. Contact portion 242 can be configured to receive a force for changing the position of bail mechanism 240. For example, if bail mechanism is pushed in unlatching direction 248, bail mechanism 240 can be moved to a permitting position (or a second position) such that pin 226 can be allowed to move between first section 215 and second section 217.

Hinge 200 can further include bail spring 246. Bail spring 246 can be configured to provide a force (or torque) that bias bail mechanism 240 in latching direction 247 toward the stopping position (the first position) such that latch 241 is positioned between first section 215 and second section 217.

Hinge 200 can further include hinge spring 250. Hinge spring 250 can be configured to provide a force (or torque) on interconnect 220 to counteract the weight of second module 120 (shown in the example of FIGS. 1A-D).

Hinge 200 can further include friction element 232. Friction element 232 can be configured to supplement the counterbalance force or torque provided by hinge spring 250 to prevent the weight of second module 120 from changing the relative position between first module 110 (shown in the example of FIGS. 1A-D) and second module 120.

Because of the torque provided by hinge spring 220, mounting interface 280 can be biased toward inside of enclosure 111 (shown in the example of FIGS. 1A-D) of first module 110. In one or more embodiments, interface 280 can include alignment structure 282 that can receive a force from a user for pulling mounting interface 280 towards outside of enclosure 111 of first module 110.

Hinge 200 can further include bail axle 249. In one or more embodiments, bail mechanism 240 can be configured to rotate around bail axle 249. Alternatively or additionally, bail mechanism can be configured to move linearly to change the position of latch 241 for toggling between a stopping position and a permitting position of the bail mechanism 240.

FIG. 3 shows, in accordance with one or more embodiments of the present invention, a perspective view of hinge 200 in a permitting configuration such that second module 120 can move (or rotate) between normal-travel range 351 (first range 351) and over-travel range 352 (second range 352) relative to first module 110. As shown in the example of FIG. 3, in the permitting configuration of hinge 200, bail mechanism 240 is in a permitting position and latch 241 is in permitting position 342 such that pin 226 can travel between first section 215 and second section 217, limited by channel 216. Accordingly, second module 120 can rotate between normal-travel range 351 and over-travel range 352 relative to first module 110. The permitting configuration of hinge 200 can be employed when the user would like to expose mounting interface 121. Further, the permitting configuration of hinge 200 can also be used when the user would like to hide the mounting interface 121 after a mounting action has been completed.

As further shown in the example of FIG. 3, assembly 100 can include gap 312 formed between surface 314 of second module 120 and a portion of enclosure 111 of first module 110. Gap 312 can represent an inter-module tolerance configured to allow relative movement (e.g., rotation, insertion, etc.) between first module 110 and second module 120 with minimum or no friction in order to minimize wear and/or deterioration of surface 314 and enclosure 111. In one or more embodiments, gap 312 can have a dimension that is no more than 0.5 mm.

Gap 312 can be further configured such that an object, such as object 330 or card 130 (shown in the example of FIG. 1A), can be inserted through gap 312 to apply a force on contact portion 242 of bail mechanism 240 for moving latch 241 from the stopping position 341 to permitting position 342. The force can be required to be strong enough to overcome the bias force exerted by bail spring 246 shown in the example of FIG. 2B.

Advantageously, with gap 312 configured for the insertion of the object, bail mechanism 240 can be moved even if no additional aperture is provided on enclosure 111 for the object to be inserted to apply the force. Without the need for the additional aperture, the structure of enclosure 111 may not be compromised, and the design of enclosure 111 and the cleaning of assembly 100 can be simplified.

Surface 314 as well as gap 312 can be configured to guide the object to apply the force on contact portion 242. Alternatively or additionally, mounting interface 121 can be configured to guide the object to apply the force on contact portion 242. Given the guidance provided by surface 314, gap 312, and/or mounting interface 121, the object can accurately apply the force on contact portion 242 within a minimized contact area. Therefore, the dimensions of contact portion 242 can be reduced. In one or more embodiments, contact portion 242 can have a dimension no greater than 1.5 mm. Advantageously, the space inside enclosure 111 can be efficiently utilized and the material cost and weight for bail mechanism 240 can be saved.

Further, surface 314, gap 312, and/or mounting interface 121 can be configured to provide support and/or reinforcement to the object in applying the force. Therefore, the required stiffness of the object can be reduced. For example, the object can have a strip configuration as illustrated by object 330 or a card configuration as illustrated by card 130 (shown in the example of FIG. 1A). The object can be formed of a plastic material instead of metal. Advantageously, the user can conveniently use a card at hand, such as a credit card or phone card, for changing hinge 200 from the stopping configuration into the permitting configuration such that second module 120 can be adjusted to the over-travel range, without the need of a special or stiff tool. Further, the use of a soft tool such as a plastic card can minimize potential mechanical and cosmetic damage to enclosure parts as well as to the hinge mechanism.

Figure 4A:
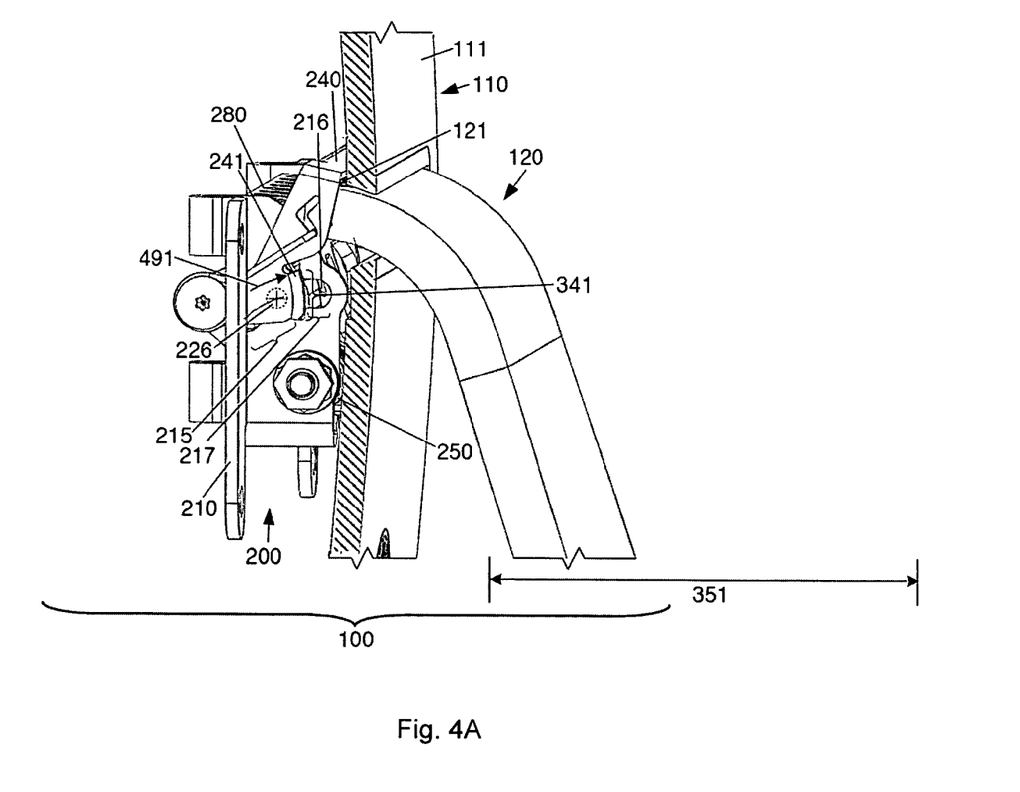
FIG. 4A shows, in accordance with one or more embodiments of the present invention, a partial perspective view of the assembly with the hinge in a stopping configuration, wherein the second module is limited within the normal-travel range.

FIG. 4A shows, in accordance with one or more embodiments of the present invention, a partial perspective view of assembly 100 with hinge 200 in a stopping configuration, wherein second module 120 is limited within normal-travel range 351. In the stopping configuration, bail mechanism 240 can be in a stopping position (or first position) such that latch 241 can be in stopping position 341 between first section 215 and second section 217 of channel 216. Given that pin 226 is within first section 215, pin 226 can be stopped from moving into second section 217, even if a force overcomes hinge spring 250 to drive pin 226 to move in first direction 491.

Correspondingly, interconnect 220 can also be stopped from rotating in first direction 491 and into an over-travel range when pin 226 is stopped by latch 241. Therefore, rotations of both of interconnect 220 and second module 120 relative to bracket 210 and first module 110 can be limited within the normal-travel ranges of interconnect 220 and second module 120, respectively.

Advantageously, mounting interfaces (e.g., mounting interfaces 121 and 280) for coupling hinge 200 and second module 120 can be hidden and protected by enclosure 111, and therefore may not be subject to unfavorable environmental factors, such as dust and spilled liquids, and unnecessary manipulation by the user. Further, aesthetic considerations for the design of the mounting interfaces can be minimized, and therefore the cost for the design can be reduced.

Figure 4B:
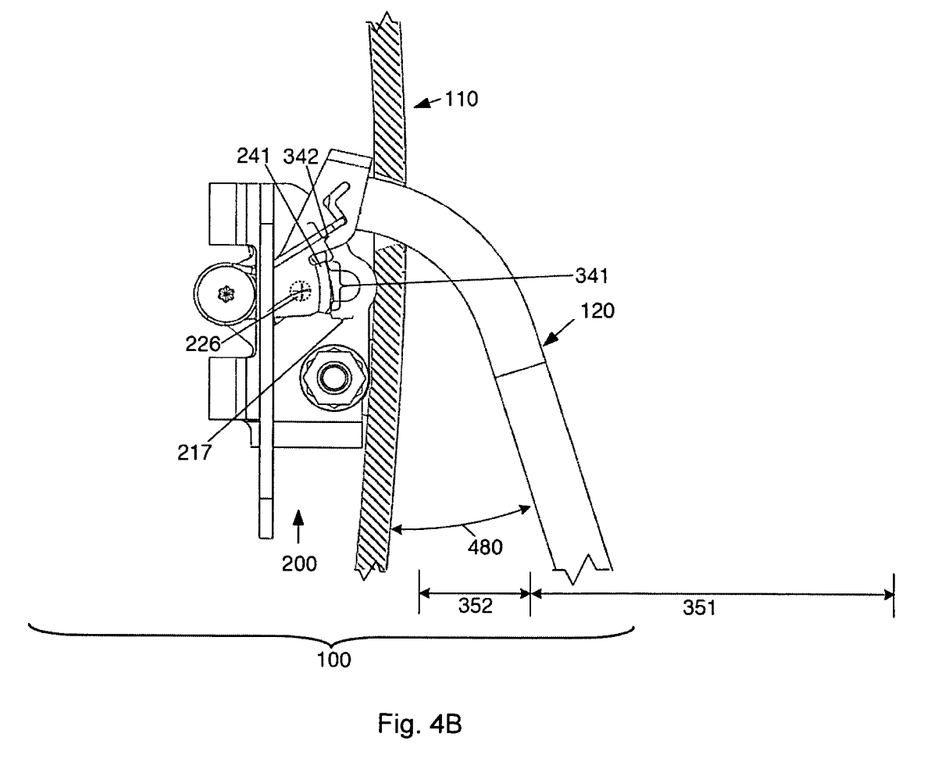
FIG. 4B shows, in accordance with one or more embodiments of the present invention, a partial side view of the assembly with the hinge in the stopping configuration, wherein the second module is limited within the normal-travel range.

FIG. 4B shows, in accordance with one or more embodiments of the present invention, a partial side view of assembly 100 with hinge 200 in the stopping configuration, wherein second module 120 is limited within normal-travel range 351.

Figure 5A:
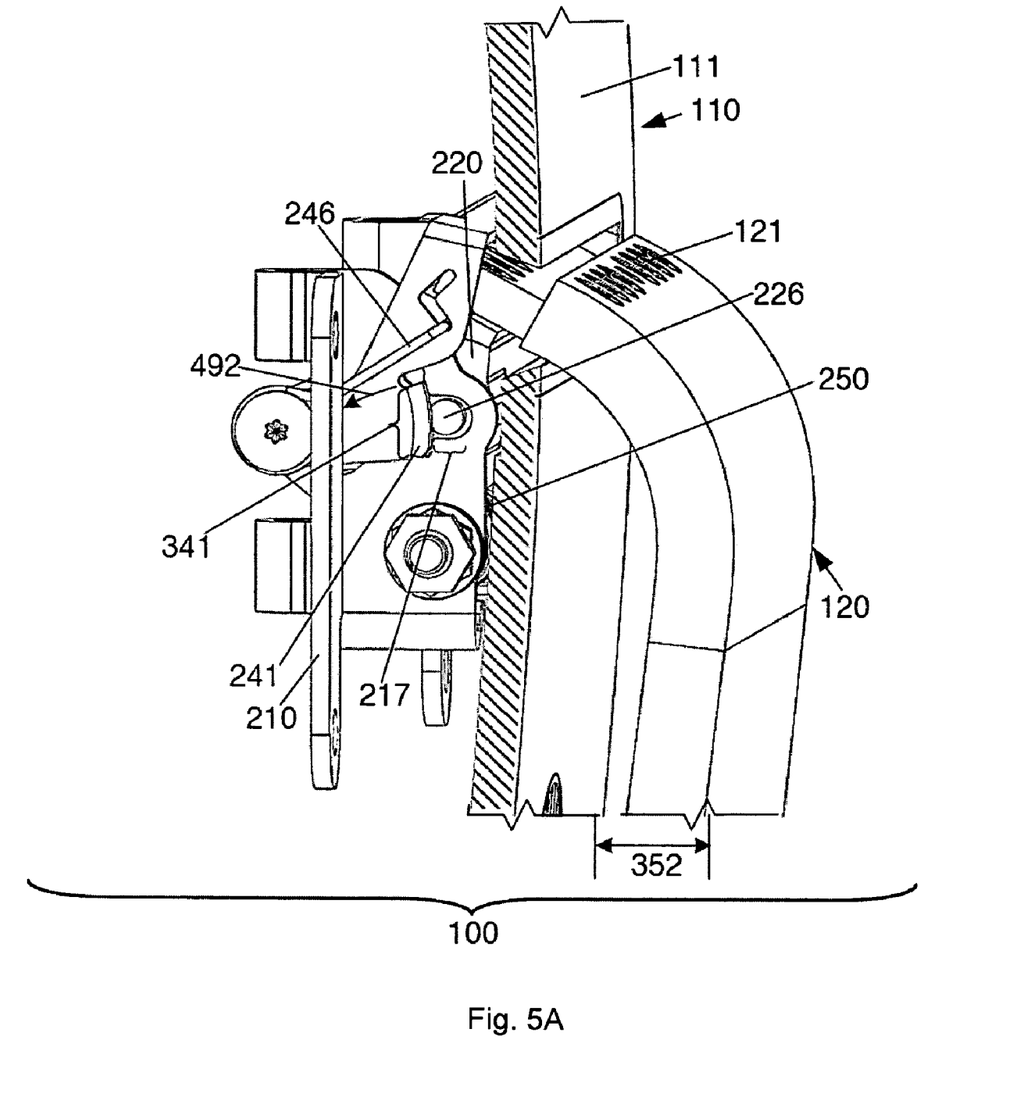
FIG. 5A shows, in accordance with one or more embodiments of the present invention, a partial perspective view of the assembly with the hinge in the stopping configuration, wherein the second module is limited within the over-travel range.
Figure 5B:
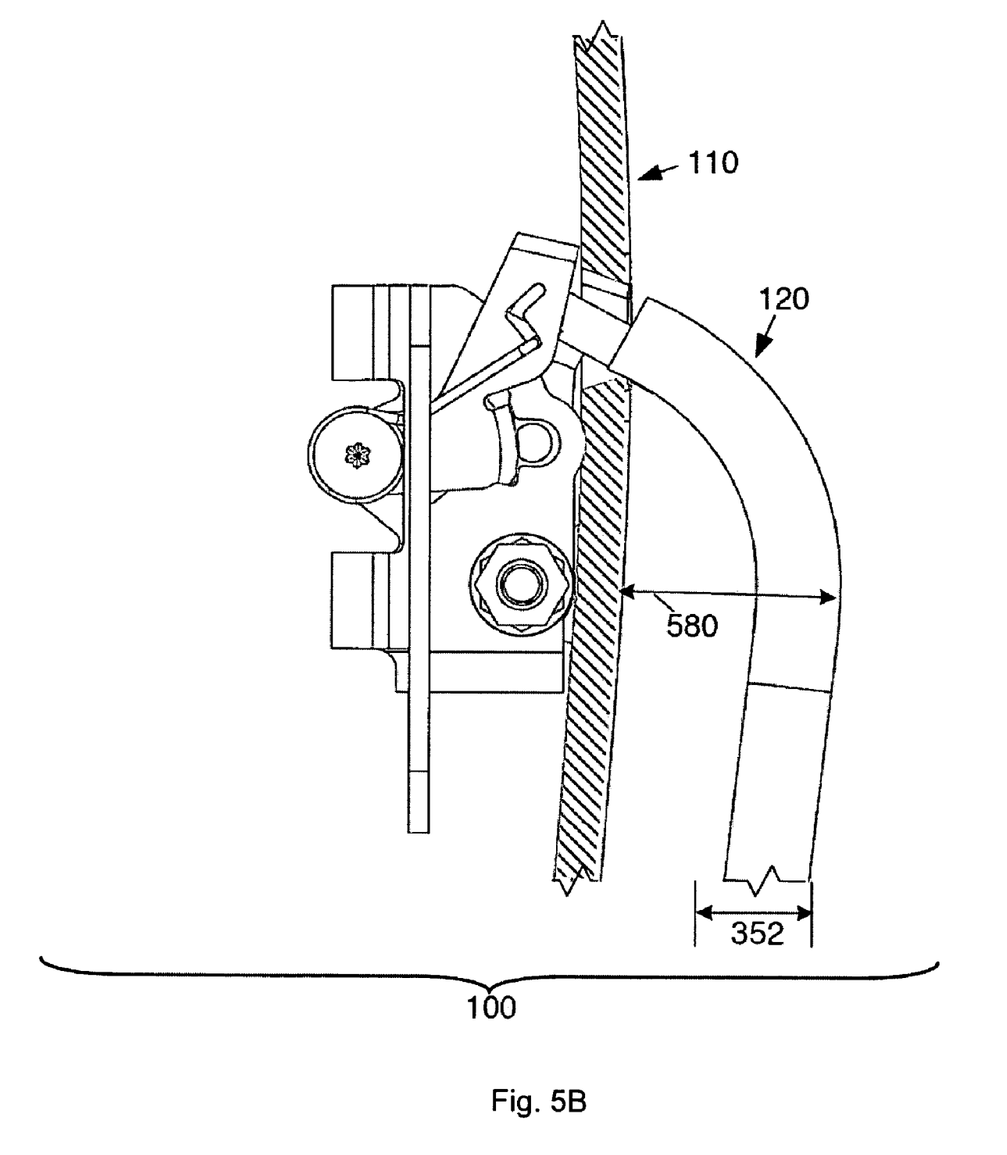
FIG. 5B shows, in accordance with one or more embodiments of the present invention, a partial side view of the hinge in the stopping configuration, wherein the second module is limited within the over-travel range.

If bail mechanism 240 is moved to the permitting position, latch 241 can move from stopping position 341 to unlatched position 342, thereby allowing pin 226 to move into second section 217, and, correspondingly, interconnect 220 (under mounting interface 280; shown in FIG. 2B) and second module 120 to move into the over-travel ranges of interconnect 220 and second module 120, respectively, as illustrated in the example of FIGS. 5A-B.

In one or more embodiments, second module 120 can be stationary, and the user can exert a force on first module 110 to overcome the torque exerted by hinge spring 250 (shown in FIG. 4A) and move first module 110, such that second module "rotates" relative to first module 110 into over-travel range 352 of second module 120.

As a result, spanning angle 480 between first module 110 and second module 120 can be minimized for storing or shipping assembly 100. Further mounting interface 121 (shown in FIG. 4A) can be exposed to be accessible to the user for tasks such as removing and/or replacing second module 120, as will be further discussed with reference to FIGS. 5A-B.

FIG. 5A shows, in accordance with one or more embodiments of the present invention, a partial perspective view of assembly 100 with hinge 200 in the stopping configuration, wherein second module is 120 limited within over-travel range 352. As discussed with reference to FIG. 4B, when a force is applied to move hinge 200 to the permitting configuration as shown in the example of FIG. 3, pin 226 can be allowed to move into second section 217. Accordingly, the user can move interconnect 220 and second module 120 into the over-travel ranges of interconnect 220 and second module 120, respectively. When the force is removed, given the bias force applied by bail spring 246, latch 241 can return to stopping position 441.

When interconnect 220 is in the over-travel range of interconnect 220 and latch 241 is in stopping position 341, even through interconnect 220 is subject to the torque exerted by hinge spring 250 and is therefore biased toward second direction 492, interconnect 220 can be stopped from moving beyond the over-travel range of interconnect 220, because pin 226 can be stopped by latch 241. The torque exerted by hinge spring 250 can urge pin 226 against latch 241, thereby minimizing movements of interconnect 220 relative to bracket 210 as well as second module 120 relative to first module 110.

Further, second section 217 can be configured to have a dimension such that pin 226 can have minimum or no movement. Accordingly, interconnect 220 and second module 120 can be in a locked position relative to bracket 210 and first module 110, respectively, when pin 226 is in second section 217 and latch 241 is in stopping position 341.

As a result, mounting interface 121 can remain exposed outside of enclosure 111 an therefore accessible and stable for the user to perform tasks such as removing second module 120 and/or installing other modules such as adapter 140 shown in the example of FIG. 1D. Advantageously, the tasks can be performed in an efficient manner.

FIG. 5B shows, in accordance with one or more embodiments of the present invention, a partial side view of assembly 100 with hinge 200 in the stopping configuration, wherein second module 120 is limited within over-travel range 352. As shown in the example of FIG. 5B, when second module 120 is limited within over-travel range 352, a dimension 580 can be reduced (or minimized) such that assembly 100 can be in a compact configuration. Advantageously, costs associated with packaging, shipping, and storing assembly 100 can be reduced.

As can be appreciated from the foregoing, embodiments of the present invention can allow hiding mounting interfaces when devices are in normal use and revealing the mounting interfaces when the mounting interfaces need to be operated, without requiring manipulating enclosures of the devices. Advantageously, the mounting interfaces can be protected from unnecessary manipulations and unfavorable environmental factors in normal use of the devices. Further, since the mounting interfaces are normally hidden, design costs associated with aesthetics and cleanliness of the mounting interfaces can be reduced. When the mounting interfaces need to be operated, conveniently, users of the devices can use a card at hand to unlock the stop mechanism for revealing the mounting interfaces without the need of a special, stiff tool. When the mounting interfaces are revealed, the devices can be in locked, stable positions such that the users can efficiently operate the mounting interfaces.

While this invention has been described in terms of several embodiments, there are alterations, permutations, and equivalents, which fall within the scope of this invention. For example, although stop mechanisms with rotational movements are illustrated in the figures, stop mechanisms with other types of movements, such as linear movements, combined rotational and linear movements, etc., can also be employed in embodiments of the present invention. It should also be noted that there are many alternative ways of implementing the methods and apparatuses of the present invention. Further, although mounting interfaces used with screws are illustrated, one or more of other fastening mechanisms such as, for example, latches, hook-and-loop fasteners, or adhesives can also be utilized. It is therefore intended that the following appended claims be interpreted as including all such alterations, permutations, and equivalents as fall within the true spirit and scope of the present invention.

What is claimed is:

1. A hinge adapted to rotatably couple a first module to a second module, the hinge comprising:
   an axle;
   a first member coupled to the axle, said first member being adapted to couple to the first module;
   a second member coupled to the axle and configured to rotate relative to the first member and around the axle, said second member being adapted to couple to the second module such that the first and second modules are rotatably coupled via said axle, said first member and said second member;
   a stop mechanism configured to stop the second member from rotating, relative to the first member, in a first direction and beyond a first range when the stop mechanism is in a first position and the second member is in the first range, the stop mechanism further configured to allow the second member to rotate, relative to the first member, in the first direction, beyond the first range, and into a second range when the stop mechanism is in a second position and the second member is in the first range, the stop mechanism including a contact portion configured to receive a force for moving the stop mechanism to the second position, the contact portion extending downward from a top portion of the stop mechanism and being disposed below the top portion of the stop mechanism;
   a first spring mechanism attached to a first portion of the stop mechanism and configured to bias the stop mechanism toward the first position; and
   a second spring mechanism attached to a second portion of the stop mechanism and configured to bias the stop mechanism toward the first position, the second portion of the stop mechanism being disposed opposite to the first portion of the stop mechanism, the second portion of the stop mechanism being connected to the first portion of the stop mechanism through the top portion of the stop mechanism, the contact portion being disposed between the first portion of the stop mechanism and the second potion of the stop mechanism, wherein said hinge is located entirely within and hidden by said first module while said hinge is rotatably coupling the first module to the second module.

2. The hinge of claim 1 wherein the stop mechanism is further configured to stop the second member from rotating, relative to the first member, in a second direction and beyond the second range when the stop mechanism is in the first position and the second member is in the second range, and the stop mechanism is further configured to allow the second member to rotate, relative to the first member, in the second direction, beyond the second range, and into the first range when the stop mechanism is in the second position and the second member is in the second range.

3. The hinge of claim 1 wherein the first member is configured to stop the second member from rotating in the first direction and beyond the second range when the second member is in the second range.

4. The hinge of claim 1 wherein the second range represents a locked position of the second member relative to the first member.

5. The hinge of claim 1 wherein the contact portion having a first dimension that is less than or equal to 1.5 mm.

6. The hinge of claim 1 wherein the second member includes an alignment structure, the alignment structure configured to align a module with the second member by mating with a matching structure of the module, the alignment structure further configured to receive a force for moving the second member in the first direction.

7. The hinge of claim 1 wherein at least one of the first member and the second member includes a mounting interface.

8. The hinge of claim 1 configured to couple a first module to a second module, at least one of the first module and the second module includes a display.

9. The hinge of claim 1 wherein the stop mechanism is further configured to rotate around the axle.

10. The hinge of claim 1 wherein the stop mechanism is configured to move between the first position and the second position through at least one of rotational motion and linear motion.

11. An assembly comprising:
    a first module;
    a second module;
       a hinge coupling the first module with the second module, wherein said hinge is located entirely within and is hidden by said first module, the hinge including
       an axle,
       a first member mounted to the first module through a first mounting interface and couple to the axle,
       a second member mounted to the second module through a second mounting interface, coupled to the axle, and configured to rotate relative to the first member and around the axle, and
       a stop mechanism configured to stop the second member from rotating, relative to the first member, in a first direction and beyond a first range when the stop mechanism is in a first position and the second member is in the first range, the stop mechanism further configured to allow the second member to rotate, relative to the first member, in the first direction, beyond the first range, and into a second range when the stop mechanism is in a second position and the second member is in the first range, the stop mechanism being further configured to rotate around the axle, one of the first module and the second module including an enclosure, the enclosure enclosing at least the stop mechanism.

12. The assembly of claim 11 wherein the stop mechanism is further configured to stop the second member from rotating in a second direction and beyond the second range when the stop mechanism is in the first position and the second member is in the second range, and the stop mechanism is further configured to allow the second member to rotate in the second direction, beyond the second range, and into the first range when the stop mechanism is in the second position and the second member is in the second range.

13. The assembly of claim 11 wherein the first member is configure to stop the second member from rotating in the first direction and beyond the second range when the second member is in the second range.

14. The assembly of claim 11 wherein the second range represents a locked position of the second member relative to the first member.

15. The assembly of claim 11 further comprising a second spring mechanism configured to apply a torque on the second member and in the second direction.

16. The assembly of claim 11 wherein the stop mechanism includes a contact portion configured to receive a force for moving the stop mechanism to the second position, the contact portion having a first dimension that is less than or equal to 1.5 mm.

17. The assembly of claim 11 wherein the second member includes an alignment structure, the alignment structure configured to align a module with the second member by mating with a matching structure of the module, the alignment structure further configured to receive a force for moving the second member in the first direction.

18. The assembly of claim 11 wherein at least one of the first mounting interface and the second mounting interface is hidden when the second member is in the first range, and the at least one of the first mounting interface and the second mounting interface is exposed when the second member is in the second range.

19. The assembly of claim 11 wherein at least one of the first mounting interface and the second mounting interface includes one or more screws.

20. The assembly of claim 11 further comprising a gap formed between the first module and the second module, the gap configured to allow the first module and the second module to move relative to each other, the gap further configured to allow an object to be inserted through the gap to apply a force on the stop mechanism for moving the stop mechanism to the second position.

21. The assembly of claim 20 wherein the object has a card configuration.

22. The assembly of claim 20 wherein the gap has a dimension that is less than or equal to 0.5 mm.

23. The assembly of claim 20 wherein at least one of the first mounting interface and the second mounting interface is configured to guide the object to apply the force on the stop mechanism.

24. The assembly of claim 20 wherein at least one of the first mounting interface and the second mounting interface is configured to reinforce the object to apply the force on the stop mechanism.

25. The assembly of claim 20 wherein at least one of the first module and the second module is configured to guide the object to apply the force on the stop mechanism.

26. The assembly of claim 20 wherein at least one of the first module and the second module is configured to reinforce the object to apply the force on the stop mechanism.

27. The assembly of claim 11 wherein at least one of the first module and the second module includes a display.

28. The assembly of claim 11 wherein the stop mechanism is configured to move between the first position and the second position through at least one of rotational motion and linear motion.

29. The assembly of claim 11, wherein said first module and said second module are substantially external with respect to each other.

30. The hinge of claim 1 wherein the first module and the second module are substantially external with respect to each other while said hinge is rotatably coupling the first module to the second module.

* * * * *

UNITED STATES PATENT AND TRADEMARK OFFICE
CERTIFICATE OF CORRECTION

| | | |
|---|---|---|
| PATENT NO. | : 7,934,292 B2 | Page 1 of 1 |
| APPLICATION NO. | : 11/650249 | |
| DATED | : May 3, 2011 | |
| INVENTOR(S) | : Brett William Degner et al. | |

It is certified that error appears in the above-identified patent and that said Letters Patent is hereby corrected as shown below:

In column 4, line 54, delete "FIG. 1A-D)." and insert -- FIGS. 1A-D). --, therefor.

In column 4, line 57, delete "FIG. 1A-D)." and insert -- FIGS. 1A-D). --, therefor.

Signed and Sealed this
Sixth Day of December, 2011

David J. Kappos
*Director of the United States Patent and Trademark Office*